United States Patent
Kälin et al.

(10) Patent No.: US 12,546,796 B2
(45) Date of Patent: Feb. 10, 2026

(54) MULTICHANNEL PIPETTING DEVICE

(71) Applicant: TECAN TRADING AG, Männedorf (CH)

(72) Inventors: Remo Kälin, Jona/SG (CH); Christina Bauer, Zürich (CH); Thomas Kunz, Rapperswil (CH)

(73) Assignee: TECAN TRADING AG, Männedorf (CH)

( * ) Notice: Subject to any disclaimer, the term of this patent is extended or adjusted under 35 U.S.C. 154(b) by 1166 days.

(21) Appl. No.: 17/476,290

(22) Filed: Sep. 15, 2021

(65) Prior Publication Data
US 2022/0099695 A1    Mar. 31, 2022

(30) Foreign Application Priority Data
Sep. 25, 2020  (EP) ..................................... 20198497

(51) Int. Cl.
*G01N 35/10*    (2006.01)
(52) U.S. Cl.
CPC ................................ *G01N 35/1074* (2013.01)
(58) Field of Classification Search
None
See application file for complete search history.

(56) References Cited

U.S. PATENT DOCUMENTS 11,311,872 B2    4/2022    Ott

FOREIGN PATENT DOCUMENTS

| CN | 109414698 A | 3/2019 | |
|---|---|---|---|
| DE | 20023896 U1 | 3/2007 | |
| JP | H08254539 A | 10/1996 | |
| WO | 2008013205 A1 | 1/2008 | |
| WO | WO 2008013205 | * 1/2008 | ......... G01N 35/1074 |

OTHER PUBLICATIONS

Chinese Office Action for corresponding Chinese Patent No. 202111115689.9 mailed on Aug. 13, 2025, 9 pages, English translation attached.

* cited by examiner

*Primary Examiner* — Ann Montgomery
(74) *Attorney, Agent, or Firm* — MH2 Technology Law Group LLP (57) ABSTRACT

A multichannel pipetting plate comprises a plurality of connectors arranged in a lattice; wherein each connector is fluidically connectable to a pipetting tip; wherein each connector comprises an interface at which a friction contact between the connector and a foot of the pipetting tip is established; wherein the interfaces of the connectors are arranged in different planes, such that, at least at a border region of the pipetting plate, along each row and along each column of the lattice, at least three consecutive interfaces are arranged in at least two different planes.

14 Claims, 11 Drawing Sheets

|   |   |   |   |   |   |   |   |
|---|---|---|---|---|---|---|---|
| 1 | 2 | 3 | 4 | 4 | 3 | 2 | 1 |
| 2 | 3 | 4 | 1 | 1 | 4 | 3 | 2 |
| 3 | 4 | 1 | 2 | 2 | 1 | 4 | 3 |
| 4 | 1 | 2 | 3 | 3 | 2 | 1 | 4 |
| 1 | 2 | 3 | 1 | 1 | 3 | 2 | 1 |
| 2 | 3 | 1 | 4 | 4 | 1 | 3 | 2 |
| 2 | 3 | 1 | 4 | 4 | 1 | 3 | 2 |
| 1 | 2 | 3 | 1 | 1 | 3 | 2 | 1 |
| 4 | 1 | 2 | 3 | 3 | 2 | 1 | 4 |
| 3 | 4 | 1 | 2 | 2 | 1 | 4 | 3 |
| 2 | 3 | 4 | 1 | 1 | 4 | 3 | 2 |
| 1 | 2 | 3 | 4 | 4 | 3 | 2 | 1 |

MULTICHANNEL PIPETTING DEVICE

CROSS-REFERENCE TO RELATED APPLICATIONS

The present application claims the benefit of priority of European Patent Application No. 20198497.8, filed on Sep. 25, 2020, the disclosure of which is incorporated by reference herein in its entirety.

FIELD OF THE INVENTION

The invention relates to a multichannel pipetting plate, a multichannel pipetting head, a multichannel pipetting device and a method for connecting a plurality of pipette tips to a multichannel pipetting plate.

BACKGROUND OF THE INVENTION

Laboratory automation devices are used for automating tasks of a laboratory assistant, which, for example, tests a patient for specific diseases. Usually, a sample of the patient's blood, urine, stool, etc. is taken and analysed by means of a bio-chemical procedure. Such a procedure consists in various operations like adding substances, incubating, separating, etc. and a measurement process which quantitatively or qualitatively measures the amount or presence of a substance indicating the specific disease.

To parallel such assay procedures, some laboratory automation devices comprises a pipetting head with a pipetting plate, to which a plurality of disposable pipette tips can be connected. With the pipetting head and/or the pipetting plate, a plurality of samples can be aspirated or dispended in one step. For connecting the plurality of pipette tips, the pipetting plate is lowered onto a cartridge or receptacle, which contains the pipette tips and is pressed onto the pipette tips, such that the pipette tips are pressed into connectors of the pipetting plate. Since there are pipetting heads for 96 or even 384 pipette tips, usually a large force is needed for pressing the pipetting plate against the pipette tips. For this, grippers directly connected to the cartridge for the pipetting tips may be used, which are anchored in the pipetting head, such that the high force has not to be applied via the suspension of the pipetting head.

Sometimes it is desirable that the pipetting plate is used solely with a subset of all possible pipetting tips. For example, there may be a need for using solely some rows or columns of the pipetting plate. In this case, the above described grippers usually cannot be used, since the pipetting head has to be lowered in an eccentric way onto the cartridge with the pipetting tips, such that solely a part of the pipetting plate is arranged above the pipetting tips to be picked up.

DESCRIPTION OF THE INVENTION

It is an object of the invention to provide a pipetting plate, which can be used for picking up solely a subset of possible pipetting tips without stressing a suspension of the pipetting plate.

This object is achieved by the subject-matter of the independent claims. Further exemplary embodiments are evident from the dependent claims and the following description.

A first aspect of the invention relates to a multichannel pipetting plate. A multichannel pipetting plate may be part of a laboratory automation device. Such a laboratory automation device may comprise a workbench onto which containers, such as microplates, reagent containers, sample containers, etc., may be placed. Also a receptacle for disposable pipetting tips may be placed on the workbench. The laboratory automation device furthermore may comprise a mover or moving device, which is adapted for moving the multichannel pipetting head plate in three spatial directions. In such a way, also the pipetting tips may be pressed into the multichannel pipetting plate. A pump of the laboratory automation device may be used to generate underpressure and overpressure in the pipetting tips for aspirating and dispensing liquids.

According to an embodiment of the invention, the pipetting plate comprises a plurality of connectors arranged in a lattice. The lattice may be a rectangular lattice, a square lattice and/or any other systematic arrangement. Each connector is fluidically connectable to a pipetting tip, such that the connector is adapted for holding the corresponding pipetting tip and/or a fluid, a gas (usually air) and/or a liquid is conveyable between the pipetting channel and the pipetting tip. Each connector furthermore may be fluidically connectable to a pipetting channel provided by a pipetting head holding the pipetting plate. Each connector may have a through hole for conveying the fluid, which through hole extends substantially orthogonal to the extension plane of the pipetting plate.

The term multi-channel may refer to the fact that the multichannel pipetting plate is adapted for holding a plurality of pipetting tips, which are connected to a plurality of pipetting channels. The pipetting channels may be connected to a pump and/or to plungers, which generates overpressure and underpressure in the pipetting tips. It may be that the pressure inside a subset of the pipetting channels is controllable independently from another subset. It also may be that the pressure inside each pipetting tip is controllable independent from the other pipetting tips. The pipetting channels may be hoses connected to the connectors.

The pipetting plate may be arranged substantially parallel to a workbench below a pipetting head, which is holding the pipetting plate.

A connector may be any means adapted for holding a pipette tip. Examples for connectors are holes, bores and/or cylinders into which a pipette tip may be stuck. A further example for a connector is a nozzle and/or cylinder, which is stuck into the pipette tip.

A pipette tip may have an elongated hollow body with an orifice at one end and a foot at the other end, which is used for connecting the pipette tip with the connector. The connector also may have a hollow body providing an interconnection between the respective pipetting channel and the respective pipetting tip.

According to an embodiment of the invention, each connector comprises an interface at which a friction contact between the connector and a foot of the pipetting tip is established, in particular when the pipetting tip and the connector are moved towards each other. The interface may be rim or a protrusion surrounding an inside or an outside of the connector. For example, the interface may be a rim inside the connector, which is touched by an upper rim of the foot of the pipette or by a sealing lip surrounding the foot of the pipetting tip, which the pipette tip is pressed into the connector. The interface also may be a sealing ring surrounding the connector, which is touched by an upper rim of the foot of the pipetting tip, which is pressed into the connector.

It has to be noted that during the process of pressing the connector and the pipetting tip together, a force between the connector and the pipetting tip has different magnitudes. Before the first contact, the force is 0. At a first contact, the force starts to increase, since then, the parts of the pipetting tip and/or the connector are deformed to fit into each other. After the first contact, the force decreases, since then only a sliding friction force between the connector and the pipetting tip has to be overcome. There may be further increases in the force, when further parts of the pipetting tip, such as sealing lips get into contact with the interface.

According to an embodiment of the invention, the interfaces of the connectors are arranged in different planes and/or levels. In such a way, the overall force, which is generated by pressing a plurality of pipetting tips into the pipetting plate, is distributed over time to the subsets of connectors, which have an interface at the same plane.

According to an embodiment of the invention, the interfaces are arranged in different planes, such that, at least at a border region of the pipetting plate, along each row and along each column of the lattice, at least three consecutive interfaces are arranged in at least two different planes. The border region may be a side of the pipetting plate with three, four or more rows or columns. The border region also may be a corner of the pipetting plate.

Along each row of the lattice, at least three consecutive interfaces are arranged in at least two different planes, where the border region overlaps the row. Furthermore, along each column of the lattice, at least three consecutive interfaces are arranged in at least two different planes, where the border region overlaps the column. When solely two of at least three consecutive interfaces are at the same level, even for border regions, which solely overlap three rows and/or columns, the overall force generated during pressing pipetting tips into the border region may be distributed between the subsets of connectors, which have an interface at the same planes.

Thus, the maximal force at the same time for pressing pipetting tips into the border region of the pipetting tip is reduced compared to a pipetting plate with connectors that all have their interfaces in the same plane.

According to an embodiment of the invention, the interfaces are arranged in different planes, such that, at least at a border region of the pipetting plate, along each row of the lattice, at least two consecutive interfaces are arranged in at least two different planes. In other words, it may be that the planes of neighboring connectors in a row are different. The same applies to the columns, i.e. at least at a border region of the pipetting plate, along each column of the lattice, at least two consecutive interfaces may be arranged in at least two different planes and/or the planes of neighboring connectors in a column may be different.

According to an embodiment of the invention, along a row and/or along a column of the lattice, a sequence of interfaces at different planes is repeated. Such a sequence need not be repeated along the complete row and/or column, but also may be repeated along a part of the row and/or column. It also may be that such a sequence is mirrored with respect to a middle axis of the pipetting plate.

According to an embodiment of the invention, the interfaces at the same plane are arranged along lines transverse to the rows and columns of the lattice. With such a pattern it may be achieved that neighboring connectors always have interfaces in different planes. A transverse line may be a line having an angle of 45° with respect to the rows and columns.

According to an embodiment of the invention, interfaces in the same plane are arranged in an X-shaped pattern or in a rhomb-shaped pattern or circle like pattern. This may be achieved by filling a quarter of the lattice with parallel lines of interfaces in the same plane and mirroring the quarter along a middle axis in parallel to the rows and a middle axis in parallel to the columns. For an X-shaped pattern, the lines in the quarter may be oriented towards a middle of the lattice. For a rhomb-shaped pattern, lines orthogonal thereto may be used.

According to an embodiment of the invention, interfaces in the same plane are arranged in an unregular pattern. An unregular pattern may be a pattern, where sequences of interfaces at different planes are not repeated, at least not along the rows and/or not along the columns.

According to an embodiment of the invention, interfaces in the same plane are arranged symmetrically with respect to a middle axis of the lattice. This may result in forces, which are symmetrically applied to the pipetting plate. One middle axis may be in parallel to the rows and one middle axis may be in parallel to the columns of the lattice. The symmetric arrangement of the interfaces may be mirror symmetric with respect to one or both of these axes.

According to an embodiment of the invention, the interfaces at the corners of the pipetting plate are in an outermost plane, with a maximal distance towards a side of the pipetting plate facing the pipetting channels. Such interfaces firstly contact the foots of the respective pipetting tips. This may have the advantage that the pipetting tips firstly contact the pipetting plate at the corners and firstly a force is applied there, which results in a more defined mechanical stress of the pipetting plate.

According to an embodiment of the invention, the connector comprises an opening for plugging the foot of the corresponding pipetting tip into the opening. The interface of the connector may be a rim of the opening. The opening may receive a sealing lip of the pipetting tip and/or may have a smaller diameter than such a sealing lip.

According to an embodiment of the invention, each connector is a bore in the pipetting plate for plugging a foot of the corresponding pipetting tip into the bore. The bore may comprise parts and/or sections with different diameters and the interface may be a rim between the parts and/or sections. A sealing lip of the pipetting tip may enter a first part without applying a force (or with at least applying a small force) onto the pipetting plate. When the sealing lip reaches the rim, where a second part with smaller diameter starts and which defines the interface, the sealing lip is pressed into the second part, where a higher force compared to the first part is applied.

According to an embodiment of the invention, each connector is a cylinder connected to the pipetting plate and/or protruding from the pipetting plate for plugging a foot of the corresponding pipetting tip into the cylinder, i.e. the cylinder provides an opening for the foots of a pipetting tip. The interface may be a rim of the cylinder. The cylinders may have different lengths in a direction orthogonal to an extension plane of the pipetting plate and in such a way interfaces in different planes may be provided. When, during a movement of the pipetting plate towards the pipetting tips, the sealing lip of the pipetting tip reaches the rim of a corresponding cylinder, the sealing lip is pressed into the cylinder and a force is applied to the pipetting plate.

According to an embodiment of the invention, each connector is a nozzle, the nozzle pluggable into the corresponding foot of the pipetting tip. In this case, the interface may be a sealing ring around the nozzle. The interface also may be a rim of the nozzle, for example at an outer end. When, during a movement of the pipetting plate towards the pipetting tips, the sealing ring or the rim touches an interior face of the foot of a pipetting tip, the nozzle is pressed into the pipetting tip and a force is applied to the pipetting plate.

According to an embodiment of the invention, the border region comprises at least three rows and/or at least three columns at a border of the lattice.

A further aspect of the invention relates to a multichannel pipetting head, which comprises a pipetting plate as described above and below and a plurality of pipetting channels, which are fluidically connected to the connectors of the pipetting plate. The pipetting plate may be exchangeable and the pipetting head may comprise means for automatically exchanging the pipetting plate within the laboratory automation device. The multichannel pipetting head may be mechanically connected to a mover, which may be provided by a laboratory automation device and/or a multichannel pipetting device as described below. The multichannel pipetting head furthermore may comprise a plurality of plungers, which are fluidically connected to the pipetting channels. The plungers, each of which may comprise a piston in a pipe, may be actuated individually to individually control a pressure in the fluidically connected pipetting tip.

A further aspect of the invention relates to a multichannel pipetting device, which comprises a multichannel pipetting head as described above and below. The multichannel pipetting device may be part of and/or may be a laboratory automation device. The multichannel pipetting device furthermore may comprise a workbench with a receptacle for receiving a plurality of pipetting tips, which are arranged in a lattice. The uppermost rims of the foots and/or the parts of the foots which firstly touches the corresponding interface of a connector foot may be arranged in one plane. The multichannel pipetting device furthermore may comprise a mover for moving the multichannel pipetting head in at least one direction in parallel to the workbench for positioning the pipetting plate at least partially above the receptacle and for moving the multichannel pipetting head towards the receptacle for pressing foots of the pipetting tips, which are arranged below the pipetting plate and connectors of the pipetting plate together.

A further aspect of the invention relates to a method for connecting a plurality of pipette tips to a multichannel pipetting plate as described above and below.

The method comprises the step of: moving the multichannel pipetting plate above the receptacle, such that solely a part of the rows and/or columns of the pipetting plate are arranged above the receptacle with pipetting tips. This movement may be performed with the mover mentioned above, which may be adapted to move the pipetting head in all three spatial directions. By moving the multichannel pipetting plate solely partially above the receptacle, solely a part of the connectors is aligned with pipetting tips on the receptacle.

The method further comprises the step of: moving the multichannel pipetting plate towards the receptacle until all pipetting tips below the pipetting plate and the corresponding connectors have been pressed into each other. The connector interfaces of the pipetting plate are arranged at different planes. Thus, during the movement towards the receptacle, at a position of the multichannel pipetting plate, where the foots of the pipetting tips reach a plane defined by interfaces of the connectors, solely a force generated by these interfaces pressed against the corresponding foots of the pipette tips has to be overcome, for moving the pipetting tips and the connectors into each other. It is not necessary to overcome the force, which would be necessary to press all pipetting tips at the same time into the connector interfaces.

When the connector interfaces are distributed into a number of x different planes, the maximal necessary force can be reduced by a factor of 1/x.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
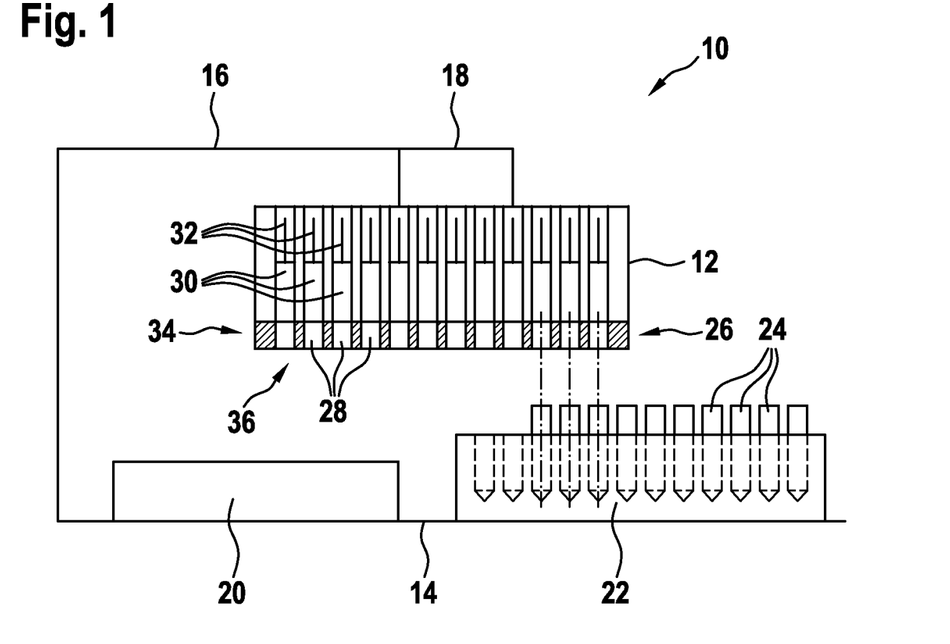
FIG. 1 schematically shows a multichannel pipetting device according to an embodiment of the invention.

FIG. 1 shows a multichannel pipetting device 10 comprising a multichannel pipetting head 12 and a workbench 14. The pipetting head 12 and the workbench are mechanically interconnected via a suspension 16, which comprises a mover 18 for moving the pipetting head 12 in parallel to the workbench 14 and orthogonal to it. The multichannel pipetting device 10 may be a laboratory automation device or may be part of a laboratory automation device.

On the workbench 14, several containers 20, such as reagent containers, microplates, etc., may be placed. Furthermore, on the workbench 14, a receptacle 22 for receiving and carrying a plurality of pipetting tips 24 is provided.

The pipetting head 12 comprises a pipetting plate 26, which for example may be automatically exchangeable in the multichannel pipetting device 10. The pipetting plate 26 comprises a plurality of connectors 28, each of which is fluidically connectable to one of the pipetting tips 24. By lowering the pipette plate 26 onto the pipetting tips 24 in the receptacle 22, the pipetting head 12 may pick up a plurality of the pipetting tips 24 with the connectors 28.

The pipetting head 12 furthermore comprises a plurality of pipetting channels 30, which are fluidically connected to the connectors 28 and a plurality of plungers 32, which are fluidically connected to the pipetting channels 30. When a pipetting tip 24 is connected to a connector 28, with the movement of the corresponding plunger 32, an overpressure or underpressure in the pipetting tip 24 can be generated. With overpressure or underpressure, a fluid may be dispensed from the pipetting tip 24 or aspirated into the pipetting tip 24. This may be used for conveying samples, liquids and reagents between containers 20.

The connectors 28 and the pipetting tips 24 in the receptacle are arranged in matching patterns, in particular a lattice (see below), such that the connectors 28 may be pushed into the pipetting tips 24 or vice versa. In FIG. 1, one row 34 of the connectors 28 is shown, while the columns 36 of the connectors extend orthogonal to the drawing plane.

With respect to FIG. 1, also a method, which may be automatically performed by the multichannel pipetting device 10, is described.

In a first step, the mover 18 moves the multichannel pipetting head 12 together with the multichannel pipetting plate 26 above the receptacle 22, such that solely a part of the rows 34 and/or columns 36 of the pipetting plate 26 are arranged above the receptacle 22 with pipetting tips 24.

FIG. 1 shows the multichannel pipetting head 12 after the first step has been performed. Some columns (here two) of the pipetting tips 24 have been removed, for example by the pipetting head 12 during a previous cycle of the method. The pipetting plate 26 is aligned such that three columns 36 of connectors 28 at the border are positioned above three columns of pipetting tips 24 in the receptacle 22.

In a second step of the method, the mover 18 moves the multichannel pipetting plate 26 towards the receptacle 22, until all pipetting tips 24 below the pipetting plate 26 (in the example the most left three columns) and the corresponding connectors 28 (in the example the most right three columns) have been pressed into each other.

Figure 2:
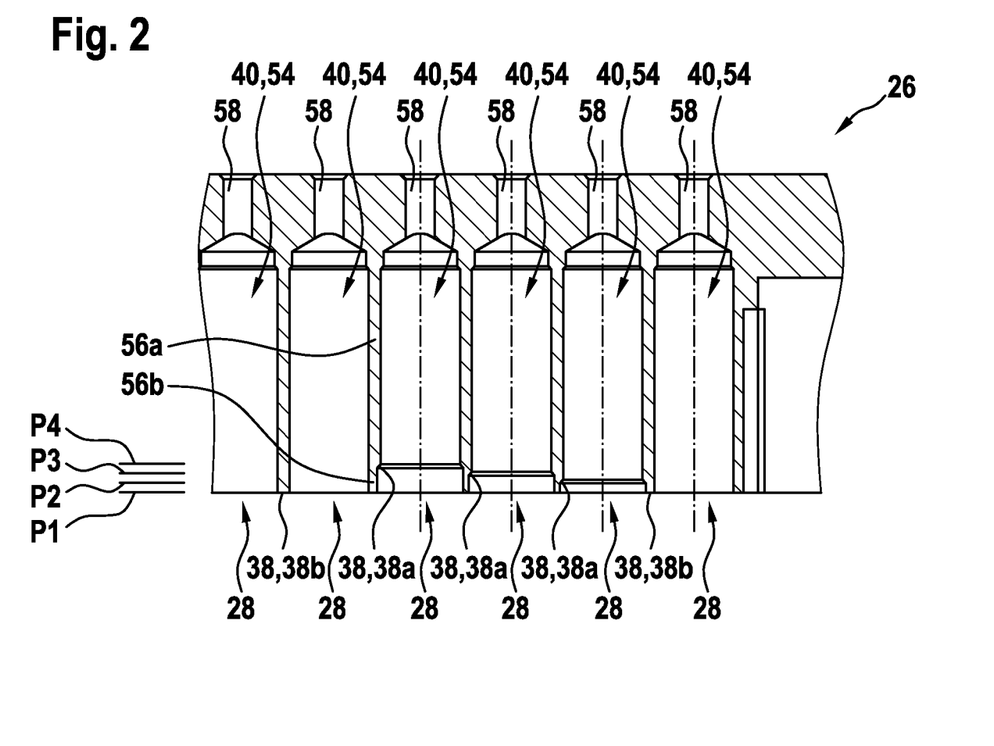
FIGS. 2, 3 and 4 schematically show cross-sectional views of multichannel pipetting plates according to embodiments of the invention.
Figure 3:
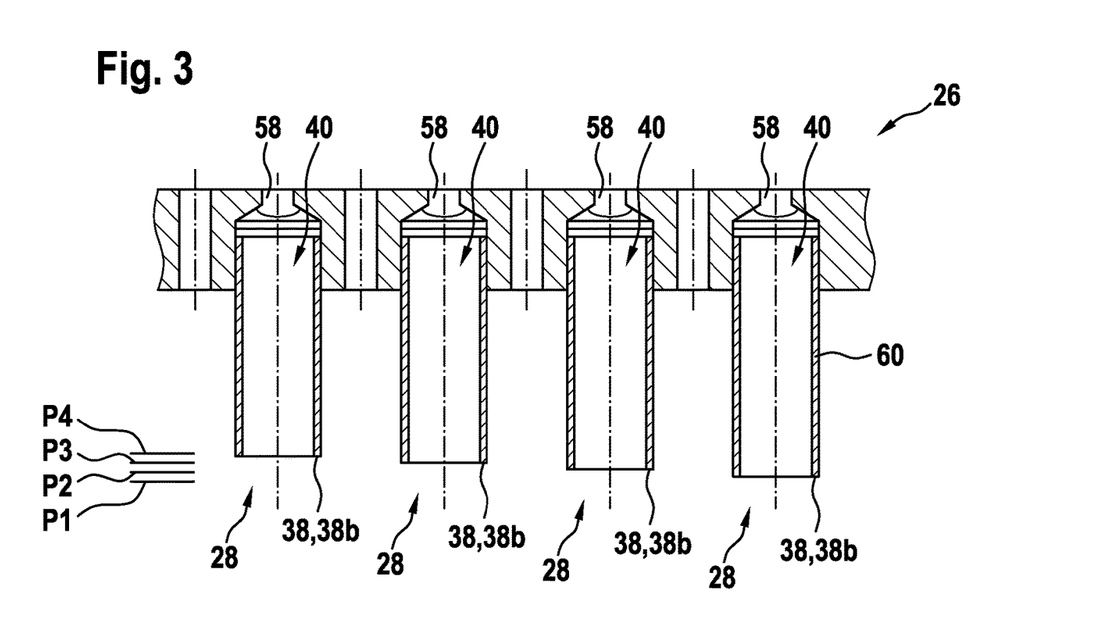
Figure 4:
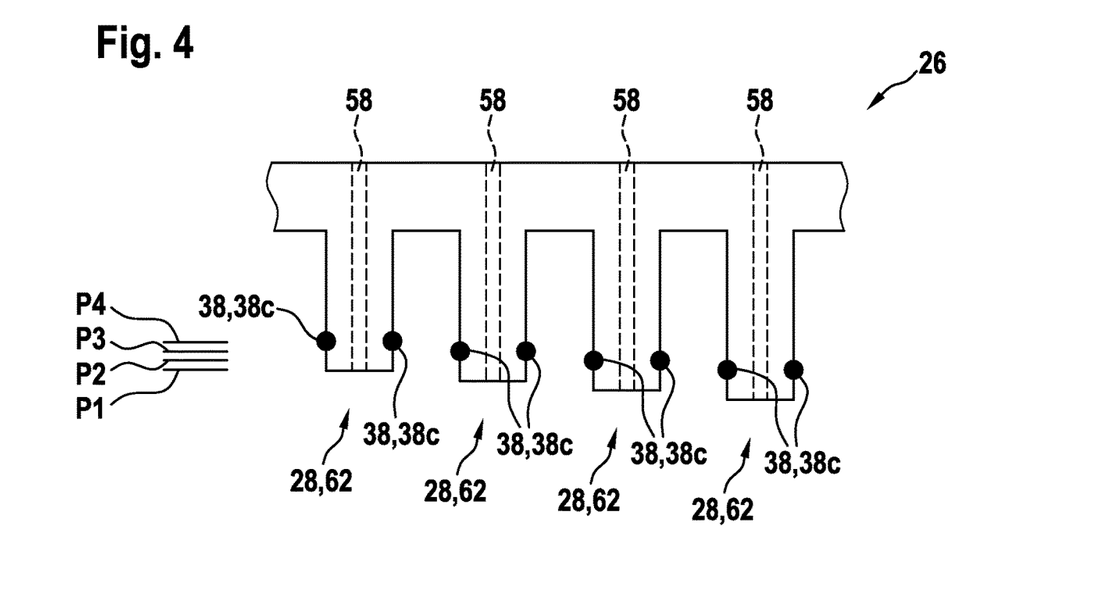

As shown in FIG. 2-4, each connector 28 comprises an interface 38 at which a friction contact between the connector 28 and the corresponding pipetting tip 24 is established. The interfaces 38 of different connectors 28 are arranged in different planes P1, P2, P3, P4.

During the movement towards the receptacle 22, at a position of the multichannel pipetting plate 26, where the pipetting tips 24 (and more particular the touching point of the pipette tips 24 with the connector 28) reach one of the planes P1-P4 defined by the interfaces 38, solely a force generated by these interfaces 38 pressed against the corresponding pipette tips 24 has to be overcome, for moving the pipetting tips 24 and the connectors 28 into each other. In such a way, the maximal force to be generated by the mover 18 and to be absorbed by the suspension 16 can be reduced. The factor of the reduction is substantially the reciprocal value of the number of planes P1, P2, P3, P4, when the interfaces 38 are equally distributed between the planes.

In FIGS. 2 and 3, a pipetting plate 26 is shown, where the connectors 28 comprise an opening 40 for plugging the foot 42 (see FIG. 5) of the corresponding pipetting tip 24 into the opening 40.

Figure 5:
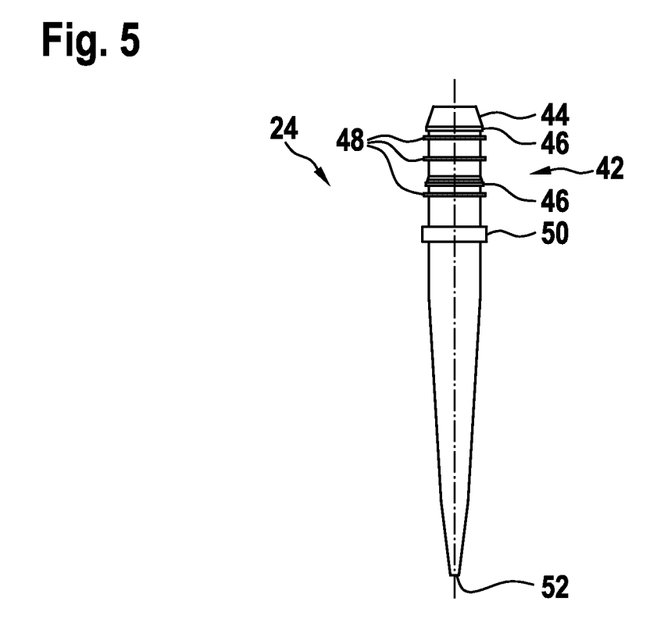
FIGS. 5 and 6 schematically show side views of pipette tips used with the multichannel pipetting plates of FIGS. 2, 3 and 4.

FIG. 5 shows a pipetting tip 24, with a foot 42, which is to be plugged into an opening 40 of a connector 28. The foot 42 has a conical end 44 to center it into the opening 40, two guidance rips 46, three sealing lips 48 and a stopper 50. In general, the pipetting tip is an elongated hollow body made of plastics, with an orifice 52 at the end opposite to the foot 42.

Returning to FIG. 2, each connector 28 is a bore 54 in the pipetting plate 26 for plugging a foot 42 of the corresponding pipetting tip 24 into the bore 54. At least some of the bores 54 comprise parts and/or sections 56a, 56b with different diameters and the interface 38 is a rim 38a between the parts 56a, 56b. When moving the foot 42 of a pipetting tip 24 into the bore, a force is the highest, when a sealing lip 48 is moved over the rim 38a or 38b.

Some of the connectors 28 solely have a section 56a with smaller diameter but not a section 56b with wider diameter. For these connectors 28, the interface 38 is the rim 38b of the opening 40.

At the sides opposite to the bores 54, the pipetting plate 26 has bores 58, which are connected to the pipetting channels 30. The distances of the rims 38a, 38b to a side of the pipetting plate 26 which faces towards the pipetting channels 30 are different from each other thus defining the different planes P1 to P4.

FIG. 3 shows that the openings 40 also may be provided by cylinders 60, which protrude from a body of the pipetting plate 26. In this case, the interfaces 38 of the connectors 28 are the rims 38b of the cylinders 60. The cylinders 60 have different heights and the distances of the rims 38b to the side of the pipetting plate 26 which faces towards the pipetting channels 30 are different from each other thus defining the different planes P1 to P4.

FIG. 4 shows a pipetting plate 26, which provides connectors 28 in the form of nozzles 62, which protrude from a body of the pipetting plate 26. In this case, the nozzle 62 is plugged into the foot 42 of the pipetting tip 24.

Figure 6:
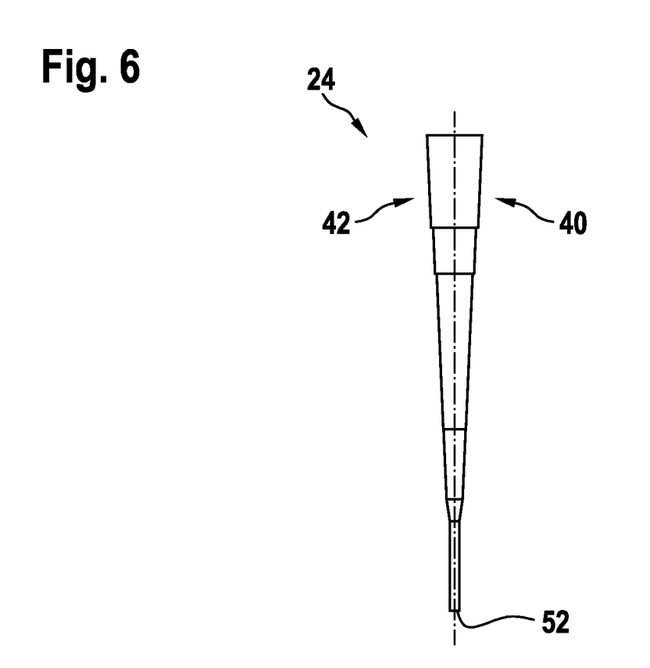

FIG. 6 shows a pipetting tip 24 with a foot 42 into which a nozzle 62 can be plugged. The foot 42 is conical and has increasing diameter towards the end of the foot 42 opposite to the orifice 52.

Returning to FIG. 4, a sealing ring 38c is provided at each end of a nozzle 62. The sealing rings 38c have an equal distance to the end of the respective nozzle 62. Since the nozzles 62 have different heights, the sealing rings 38c are on different heights and define the planes P1 to P4 for the interfaces 38. When moving the foot 42 of a pipetting tip 24 over the nozzle 62, a force is the highest, when the sealing ring 38c touches the inner surface of the foot 42.

The remaining figures show, how the interfaces 38 can be distributed in the different planes P1-P4. It has to be understood that the patterns shown in these figures also can be made, when the interfaces 38 are distributed to three, five or more planes.

Figure 10:
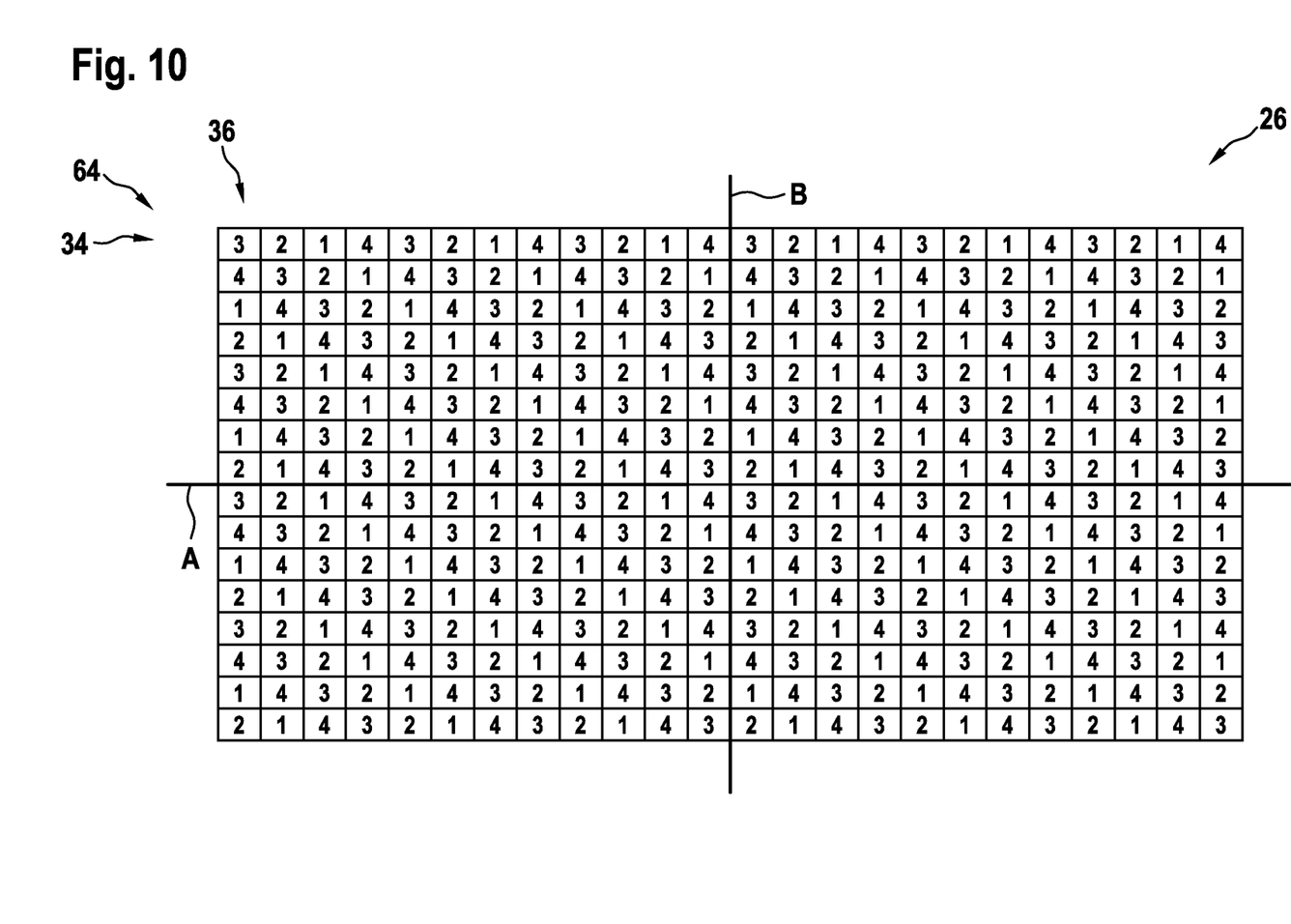
Figure 11:
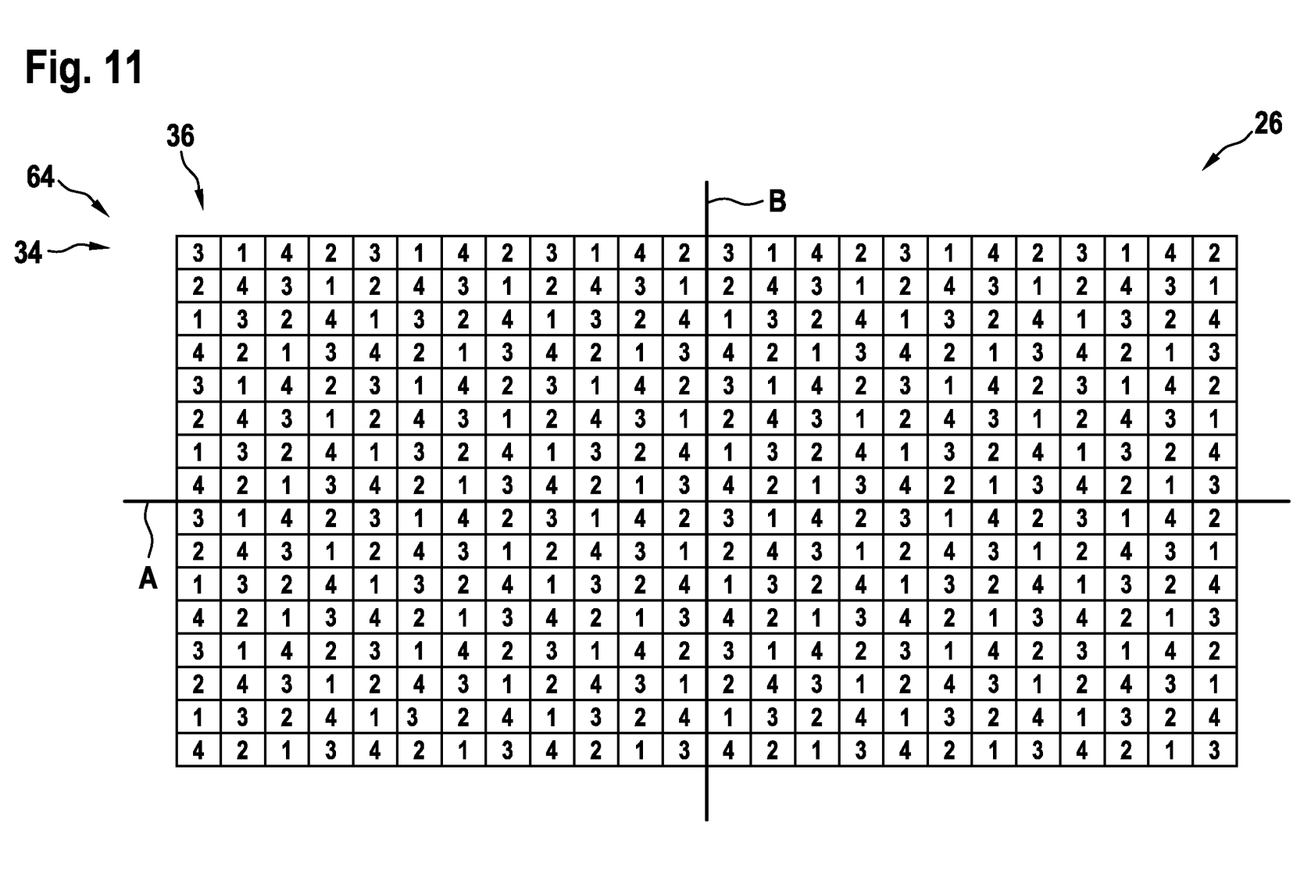
Figure 12:
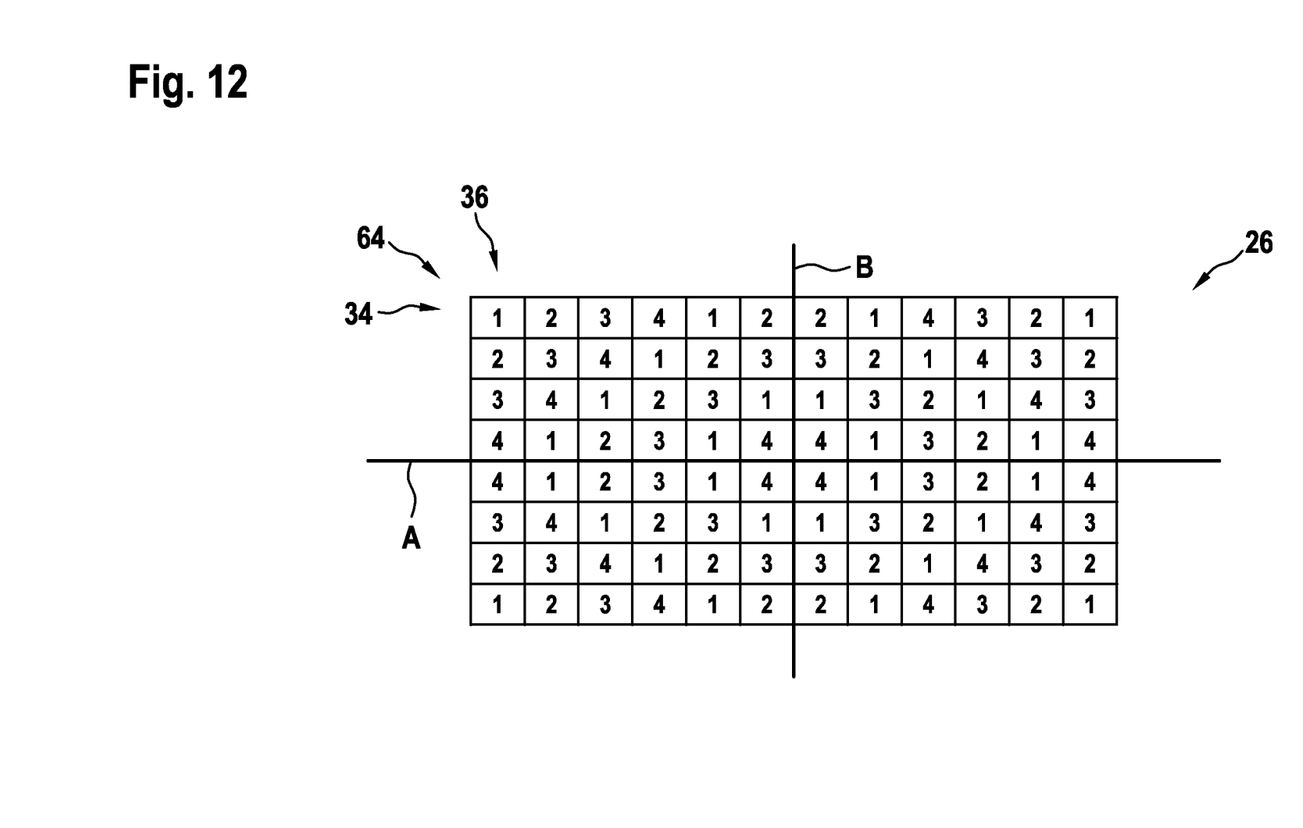
Figure 13:
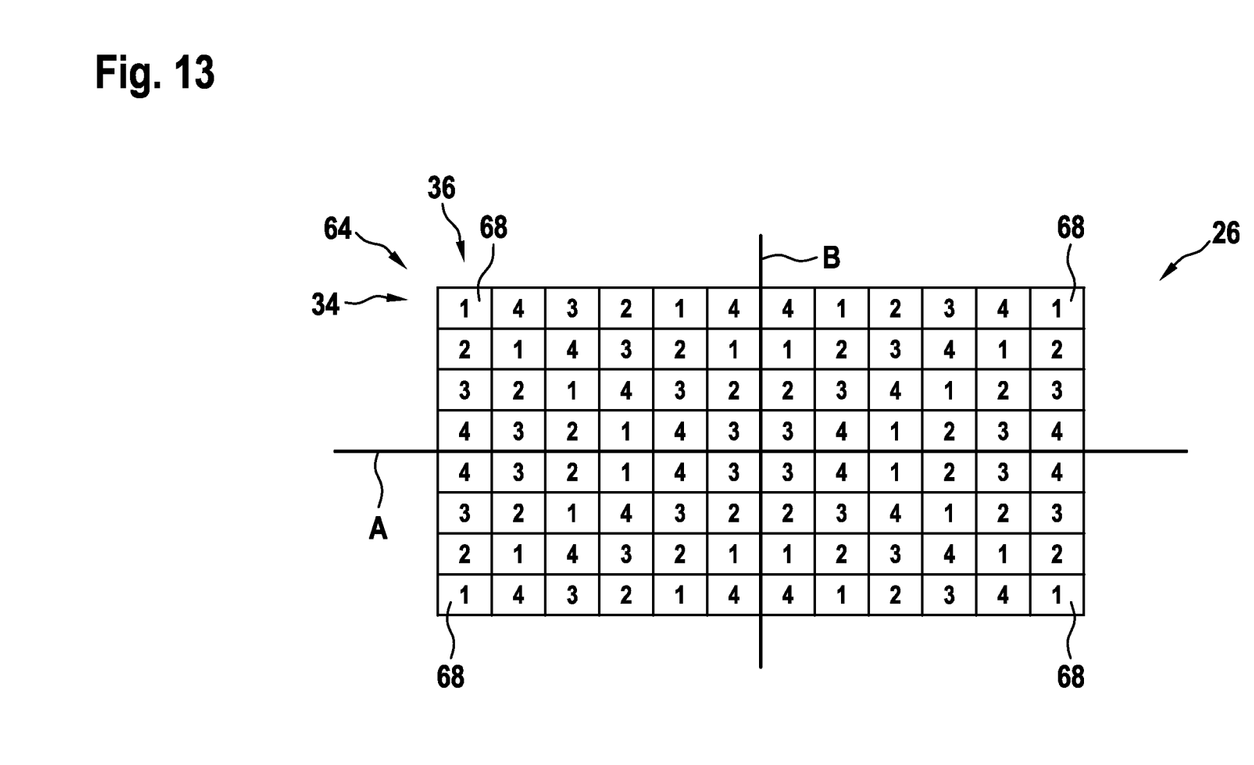
Figure 14:
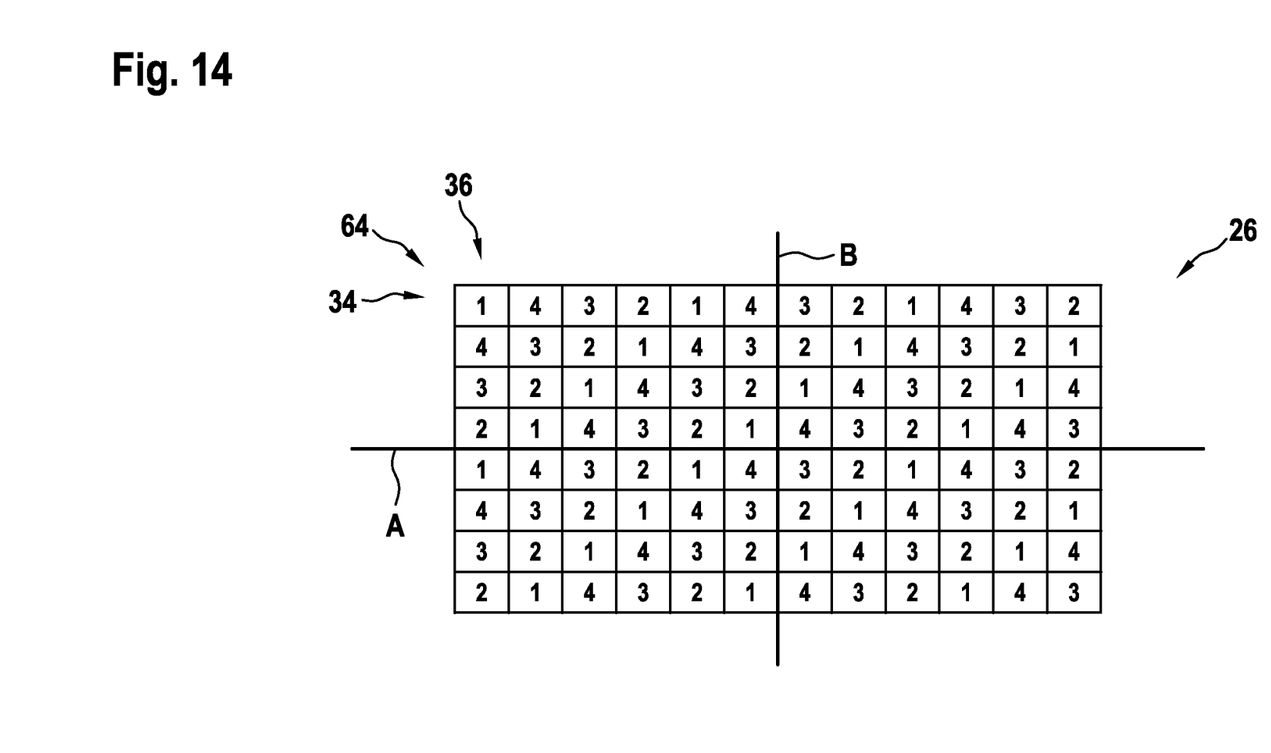

In general, FIGS. 7 to 14 show a schematic view onto the pipetting plate 26 towards the side providing the connectors 28. Each rectangle represents a connector 28, which are arranged in a lattice 64 composed of rows 34 and columns 36. FIGS. 7 to 11 show pipetting plates 26 with 384 (i.e. 16×24) connectors 28. FIGS. 12 to 14 show pipetting plates 26 with 96 (i.e. 8×12) connectors 28. The lattices 64 correspond to the well positions of lattice according to ANSI (American National Standards Institute)/SLAS Microplate Standard 4-2004.

Figure 7:
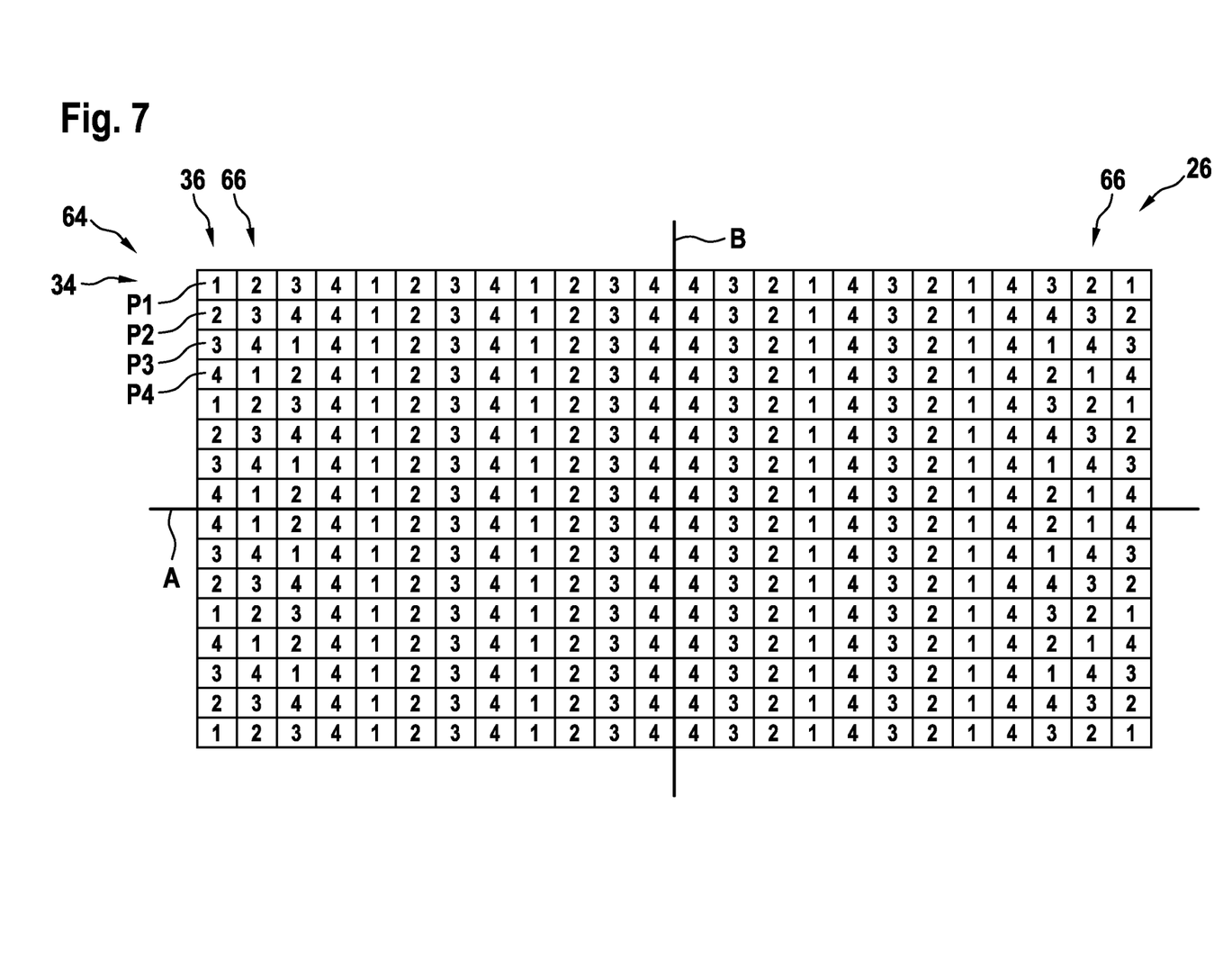
FIGS. 7 to 14 schematically show top views onto multichannel pipetting plates according to embodiments of the invention.

As indicated in FIG. 7, all rectangles with a "1" inside corresponds to a connector 28 with an interface at plane P1. Correspondingly, all rectangles with a "2", "3" and "4" inside corresponds to a connector 28 with an interface at plane P2, P3, P4, respectively.

In all FIGS. 7 to 14, the interfaces 38 of the connectors 28 are arranged in the planes P1, P2, P3, P4, such that, along each row 34 and along each column 36 of the lattice 64, at least three consecutive interfaces 38 are arranged in at least two different planes P1, P2, P3, P4. However, this solely needs to be the case in a border region 66 of the lattice 64 and/or the pipetting plate 26. Such border regions 66, which are composed of three columns 36, are shown in FIG. 7.

As shown in FIG. 7, the border region 66 may comprise at least three rows 34 and/or at least three columns 36 at a border of the lattice 64. Furthermore, in FIG. 7, in between the border region 66, the interfaces of a column 36 are in the same plane P1, P2, P3, P4. It may be that the pattern of the middle part of FIG. 7 is combined with the pattern in one of the other FIG. 8-14, i.e. that the border region 66 in FIG. 7 is replaced with the corresponding pattern as shown in these figures.

In all FIGS. 7 to 14, a middle axis A in parallel to the rows 34 and a middle axis B in parallel to the columns 36 are depicted. All patterns of interfaces 38 are either mirror symmetric to these axes (FIG. 7, 8, 9, 12, 13) or translational symmetric (FIG. 10, 11, 14).

In all FIGS. 7 to 14, along a row 34 and/or along a column 36 of the lattice 64, a sequence of interfaces 38 at different planes P1, P2, P3, P4 is repeated. This sequence is P1, P2, P3, P4, where P1, P2, P3, P4 are planes with decreasing distance towards a side of the pipetting plate 26 facing the pipetting channels 30. In the sequences, neighboring connectors 28 may be associated with a different plane P1, P2, P3, P4. It may be that due to a mirror symmetry with respect to the axis A and/or B, two connectors 28 besides the axis A and/or B are associated with the same plane P1, P2, P3, P4.

Figure 8:
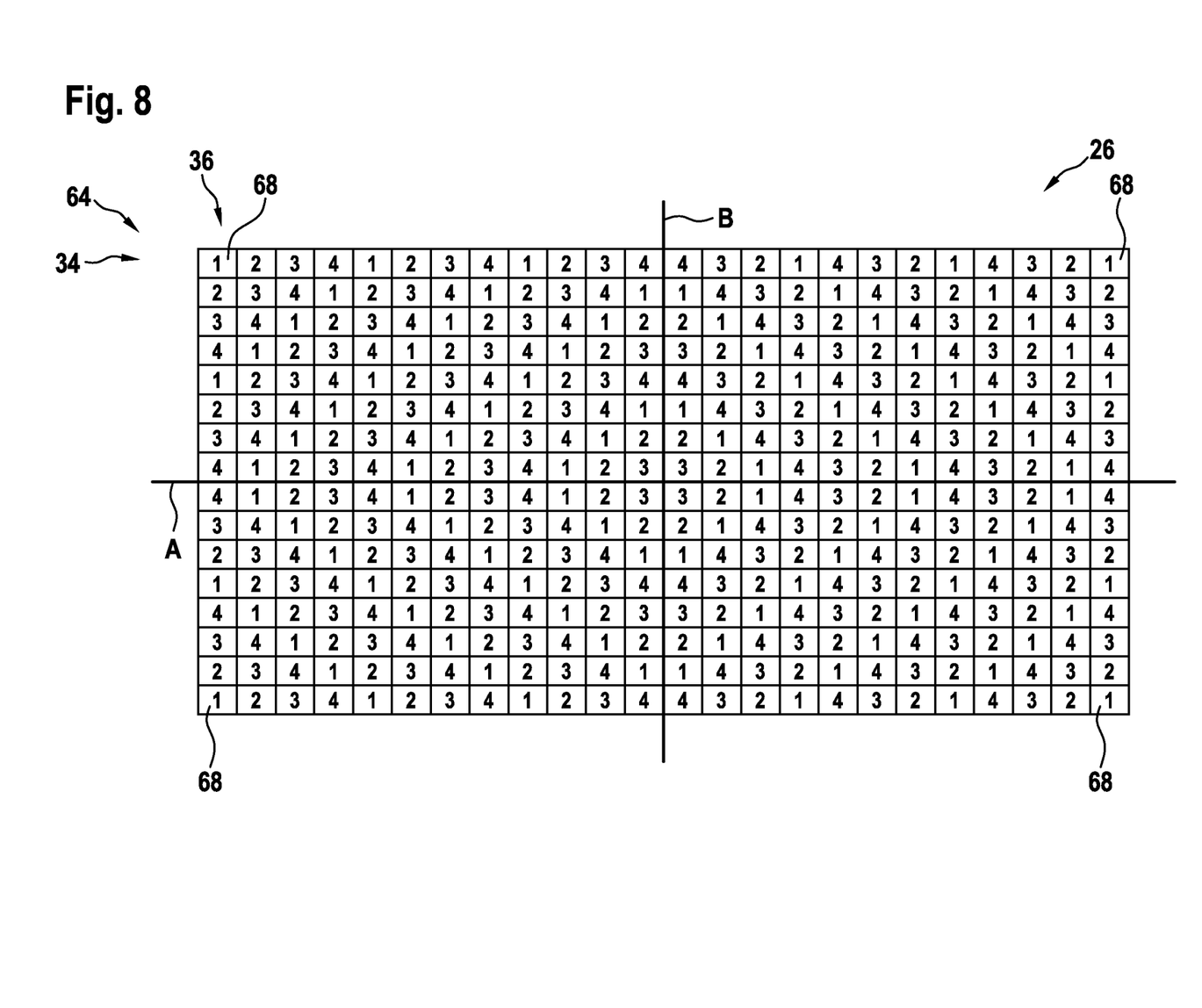
Figure 9:
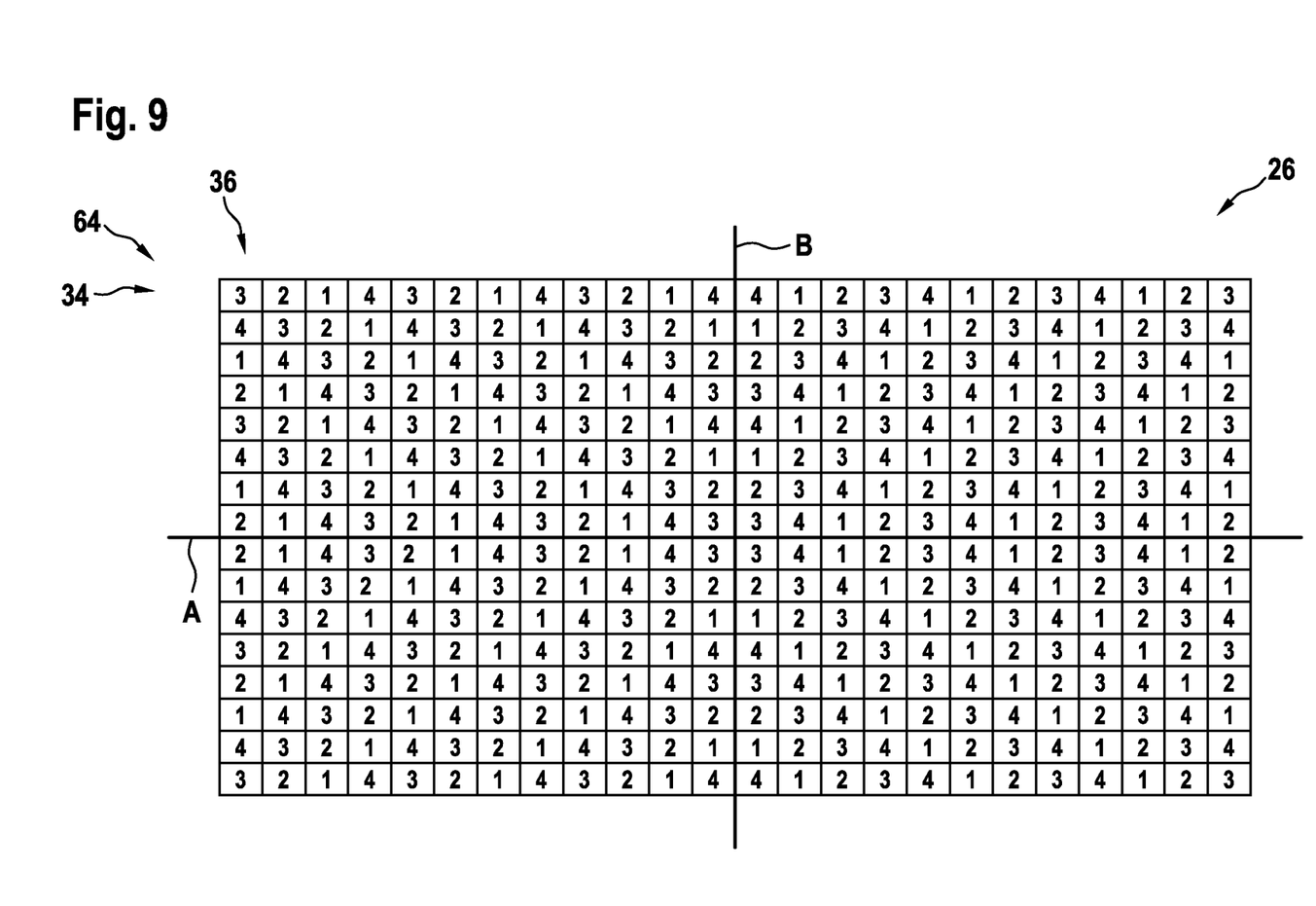

Except in FIG. 11, the interfaces 38 at the same plane P1, P2, P3, P4 are arranged along lines transverse to the rows 34 and columns 36 of the lattice 64. In the case of a mirror symmetry, the interfaces 38 in the same plane P1, P2, P3, P4 may be arranged in an X-shaped pattern (FIG. 9, 13) or in a rhomb-shaped pattern (FIG. 8, 12). Such a symmetric arrangement may lead to a corresponding symmetric force distribution onto the pipetting plate 26. In the case of a translation symmetry, the lines may run continuously through the complete lattice 64.

It also may be that the interfaces 38 in the same plane P1, P2, P3, P4 are arranged in an unregular pattern (FIG. 11). However, the overall pattern of the pipetting plate 26 may be composed of unregular patterns, which have translational symmetry, i.e. are equal, such as shown in FIG. 11.

In FIG. 8 and FIG. 13, the pipetting plates 26 have been designed that the interfaces 38 at the corners 68 of the pipetting plate 26 are in an outermost plane P1, with a maximal distance towards a side of the pipetting plate 26 facing the pipetting channels 30. This has the advantage that a first mechanical contact between the pipetting plate 26 and the pipetting tips is at the corners 68, which may lead to a more controlled force distribution along the pipetting plate 26. The whole pipetting plate 26 may be pressed via the corners 68 against its support in the pipetting head 12.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A multichannel pipetting plate, comprising:
 a plurality of connectors arranged in a lattice;
 wherein each connector is fluidically connectable to a pipetting tip;
 wherein each connector comprises an interface at which a friction contact between the connector and a foot of the pipetting tip is established;
 wherein the interfaces of the connectors are arranged in different planes, such that, at least at a border region of the pipetting plate, along each row and along each column of the lattice, at least three consecutive interfaces are arranged in at least two different planes; and
 wherein interfaces in the same plane are arranged mirror symmetrically with respect to a first middle axis of the lattice, which first middle axis is in parallel to the rows of the lattice, and are arranged mirror symmetrically with respect to a second middle axis of the lattice, which second middle axis is in parallel to the columns of the lattice.

2. The multichannel pipetting plate of claim 1, wherein along a row and/or along a column of the lattice, a sequence of interfaces at different planes is repeated.

3. The multichannel pipetting plate of claim 1, wherein the interfaces at the same plane are arranged along lines transverse to the rows and columns of the lattice.

4. The multichannel pipetting plate of claim 1, wherein interfaces in the same plane are arranged in an unregular pattern.

5. The multichannel pipetting plate of claim 1, wherein the interfaces at the corners of the pipetting plate are in an outermost plane, with a maximal distance towards a side of the pipetting plate facing the pipetting channels compared to the interfaces at different planes.

6. The multichannel pipetting plate of claim 1, wherein the connector comprises an opening for plugging the foot of the corresponding pipetting tip into the opening; and
 wherein the interface of the connector is a rim of the opening.

7. The multichannel pipetting plate of claim 1, wherein each connector is a bore in the pipetting plate for plugging a foot of the corresponding pipetting tip into the bore; and
 wherein at least some of the bores comprise parts with different diameters and the interface is a rim between the parts.

8. The multichannel pipetting plate of claim 1, wherein each connector is a cylinder connected to the pipetting plate for plugging a foot of the corresponding pipetting tip into the cylinder; and
 wherein the interface is a rim of the cylinder.

9. The multichannel pipetting plate of claim 1, wherein each connector is a nozzle, the nozzle pluggable into the corresponding foot of the pipetting tip; and
 wherein the interface is a sealing ring around the nozzle.

10. The multichannel pipetting plate of claim 1, wherein the border region comprises at least three rows and/or at least three columns at a border of the lattice.

11. The multichannel pipetting plate of claim 1, wherein interfaces in the same plane are arranged in an X-shaped pattern or in a rhomb-shaped pattern.

12. A multichannel pipetting head, comprising:
 a pipetting plate according to claim 1; and
 a plurality of pipetting channels, which are fluidically connected to the connectors of the pipetting plate.

13. A multichannel pipetting device, comprising:
 a multichannel pipetting head according to claim 12;
 a workbench with a receptacle for receiving a plurality of pipetting tips, which are arranged in a lattice; and
 a mover for moving the multichannel pipetting head in at least one direction in parallel to the workbench for positioning the pipetting plate at least partially above the receptacle and for moving the multichannel pipetting head towards the receptacle for pressing foots of the pipetting tips, which are arranged below the pipetting plate, and connectors of the pipetting plate together.

14. A method for connecting a plurality of pipette tips to a multichannel pipetting plate with a multichannel pipetting device according to claim 13, the method comprising:
- moving the multichannel pipetting plate above the receptacle, such that solely a part of the rows and/or columns of the pipetting plate are arranged above the receptacle with pipetting tips;
- moving the multichannel pipetting plate towards the receptacle until all pipetting tips below the pipetting plate and the corresponding connectors have been pressed into each other; and
- wherein during the movement towards the receptacle, at a position of the multichannel pipetting plate, where the foots of the pipetting tips reach a plane defined by interfaces of the connectors, solely a force generated by these interfaces pressed against the corresponding foots of the pipette tips has to be overcome, for moving the pipetting tips and the connectors into each other.

* * * * *